United States Patent Office 3,394,114
Patented July 23, 1968

3,394,114
PROCESS FOR COPOLYMERIZING VINYL ESTERS OF ALPHA-BRANCHED MONOCARBOXYLIC ACIDS WITH ETHYLENICALLY UNSATURATED COMPOUNDS
William S. Anderson, Oakland, Calif., assignor to Shell Oil Company, New York, N.Y., a corporation of Delaware
No Drawing. Filed Sept. 8, 1965, Ser. No. 485,944
5 Claims. (Cl. 260—87.3)

ABSTRACT OF THE DISCLOSURE

Vinyl esters of alpha-branched saturated monocarboxylic acids are copolymerized with alpha-monoolefins in the presence of an aqueous silver salt solution at low temperatures and pressures.

---

This invention relates to a process for preparing copolymers of vinyl esters of monocarboxylic acids with other ethylenically unsaturated compounds. More particularly the invention relates to a process for preparing copolymers of vinyl esters of saturated aliphatic monocarboxylic acids branched at the alpha position with other ethylenically unsaturated compounds.

Polymers of vinyl carboxylates have become of increasing commercial interest. However, for many practical uses, it is necessary that these polymers be flexible but at the same time durable and in addition have rather high resistance to hydrolysis and the action of other chemicals. While polyvinyl esters are suitable for many purposes, they suffer from many disadvantages. For example, polyvinyl acetate is known to be hard and brittle and when used in emulsion paints, must invariably be modified with plasticizers. Further, such esters are readily saponified with alkali and hydrolyze fairly rapidly in suspension. Thus, paint films and other coatings prepared from these esters not only have poor tensile strength but also have high water absorption and poor resistance to wet brushing.

On the other hand, it has been found that copolymers of vinyl esters of saturated monocarboxylic acids branched at the alpha position and other ethylenically unsaturated compounds possess very desirable properties for use in coating compositions and the like. For example, it is found that these copolymers have satisfactory tensile strength and high resistance to saponification and hydrolysis. Such copolymers also have high chemical resistance. These qualities make the copolymers extremely attractive for the preparation of paint compositions which films have low water absorption and very good resistance to wet brushing.

Coming within this group of desirable copolymers are the copolymers of an olefin such as ethylene and propylene and a vinyl ester of a saturated monocarboxylic acid branched at the alpha position. However, heretofore the preparation of such copolymers have necessitated the use of methods requiring relatively high pressures and temperatures in order to obtain any appreciable amounts of copolymers. Pressures necessary for example have ranged from about 1500 to 45,000 p.s.i.g. Obviously, such methods require the use of equipment and reactors that can produce and/or withstand the high pressures thereby rendering the production of the copolymers less commercially attractive.

This invention provides a process whereby vinyl esters of the alpha-branched saturated monocarboxylic acids and olefin monomers may be copolymerized at relatively low pressures and temperatures. More specifically, the invention provides a process for preparing copolymers of alpha-branched saturated aliphatic monocarboxylic acid vinyl esters and ethylene at low pressure and temperature.

It has now been found that vinyl esters of alpha-branched monocarboxylic acids can be copolymerized with other monomeric materials and particularly ethylene at pressures between about 10 and 1000 p.s.i.g. and temperatures between about 0° and 40° C. in the presence of aqueous solutions of silver salts. This method is especially desirable for the preparation of copolymers of vinyl esters of saturated alpha-branched aliphatic monocarboxylic acids and ethylene since copolymers having a relatively large amount of the latter can be prepared from low pressures of ethylene.

The vinyl esters of alpha-branched saturated monocarboxylic acid utilized in the process of the invention are those esters of saturated aliphatic monocarboxylic acids in which the carboxyl groups are linked to tertiary and/or quaternary carbon atoms. These acids are commonly referred to as Koch acids in the art. The preferred acids are alpha,alpha-dialkyl saturated monocarboxylic acids of from 4 to 20 carbon atoms and especially 5 to 15 carbon atoms and having the formula:

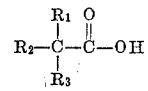

wherein $R_1$ and $R_2$ each reprseent the same or different alkyl radicals of normal, branched or cyclic structure and $R_3$ represents hydrogen or an alkyl radical. Examples of $R_1$, $R_2$ and $R_3$ are methyl, ethyl, propyl, butyl, pentyl, octyl, decyl, etc. Suitable acids are those prepared by the reaction of formic acid, or of carbon monoxide with water, with mono-olefins in the presence of liquid highly acidic inorganic catalysts, such as sulfuric acid, phosphoric acid, boron trifluoride and water, complexes of phosphoric acid, complexes of sulfuric acid, etc. such as described, for example, in U.S. 3,047,622; 3,059,004; 3,059,005; 3,059,006; and 3,059,007. The acids prepared by these methods are mixtures of alpha,alpha-dialkyl saturated monocarboxylic acids of the same number of carbon atoms and of the general formula set forth above. Very suitable acids are those prepared from monoolefinic hydrocarbons such as propylene, butylene-1, butylene-2, isobutylene, pentenes, hexenes, heptenes, octenes, etc. and polymers and copolymers of alkenes such as di-isobutylene, propylene trimer, propylene tetramer, etc. under conditions as set forth in the above mentioned patents. Such acids may also be prepared from mixtures of olefins obtained, for example, by cracking paraffins. The vinyl esters of the alpha-branched monocarboxylic acids may be prepared by known methods such as by reaction of the acid or acid mixture with vinyl acetate in the presence of a mercury salt or by the reaction of the acid with acetylene in the presence of metallic catalysts such as zinc, cadmium or mercury compounds. Such methods are known to those skilled in the art.

The copolymerization of the vinyl esters of the alpha-branched saturated carboxylic acids and ethylene according to the process of this invention is surprising and unexpected since other similar unsaturated monomers and ethylene do not satisfactorily copolymerize in the presence of the aqueous silver salt solution. For example, attempts to copolymerize ethylene with methyl vinyl ether, vinyl chloride, vinyl acetate or ethyl acrylate respectively under the conditions of the instant process have not been successful.

The copolymerization reaction of the invention is carried out in the presence of a silver salt. The salt must be one which is highly dissociated in aqueous solution. Suitable silver salts include for example silver perchlorate, silver fluoborate, silver fluosilicate, silver fluophosphate, silver fluoantimonate, silver nitrate, silver dialkylphosphates, silver perfluorocarboxylates, such as silver trifluoroacetate and the like. Silver perchlorate is preferred because of its catalytic activity and availability.

The amount of silver salt catalyst utilized depends somewhat on the type of copolymer desired. Thus, the copolymeric properties and molecular weights, and polymer uses may influence the catalyst concentrations to be used. Generally, the higher the concentration of silver salts, the faster the reaction and the higher the molecular weight of the copolymer. The aqueous silver salt catalyst solution used may be as high as about 85% by weight solution of the salt. However, aqueous salt solutions of about 10 to about 60% by weight are preferred. Catalyst concentrations providing between about 10 and 95% by weight of silver salt based on the total weight of the monomers plus the silver salt are suitable.

The presence of a small amount of initiator is also preferred in the instant process. Suitable initiators are those which will generate free radicals at the low reaction temperatures without generating free oxygen. Such initiators include isopropyl percarbonate, ethyl percarbonate, potassium persulfate, and ammonium persulfate. The amount of initiator used may be between about 0.001 and 1.0% by weight of the total composition.

The molar ratio of vinyl esters to olefin is preferably between about 4:1 and 1:4 and more preferably between about 2:1 and 1:4 respectively. Since the rates of polymerization of the two types of monomer are different, the composition of the copolymer may be varied somewhat by varying the amounts of each monomer present during the polymerization. However, it is preferable to prevent the concentration of the vinyl ester monomer from being too great at one time thereby reducing the homopolymerization thereof. High concentrations of ester monomer may be avoided by incremental addition to the polymerization reactor.

As set forth above, one of the important advantages of the instant process is that relatively low pressure and temperatures may be utilized throughout the polymerization reaction. Pressures may be between about 10 and 1000 p.s.i.g. and preferably between about 50 and 500 p.s.i.g. Temperatures between about 0° and 40° C. are quite satisfactory.

The specific techniques used in the polymerization and product recovery are not particularly critical other than as set forth above. The reaction may be stopped and the copolymer recovered by any convenient means as will be appreciated to those skilled in the art. Thus, for example, the organic reaction products may be separated from the inorganic salts by dissolving the organic materials in a hot hydrocarbon material. During the copolymerization reaction, some homopolymerization of the olefin may take place. In order to separate the copolymer from the polyolefin, the polymer mixture may be treated with a selective solvent such as a polar organic material e.g., tetrahydrofuran, dioxane, etc., which will dissolve the copolymer from which solution it may be recovered.

The following examples are provided to better illustrate the manner in which the invention is carried out. It is to be understood that the examples are for the purpose of illustration only and the invention is not regarded as limited thereto. Unless otherwise specified, parts and percentages disclosed in the examples are given by weight.

Example I

Into a 200 ml. heavy wall glass reactor was added 50 ml. of 20% aqueous $AgClO_4$. The reactor was flushed with nitrogen and heated to remove oxygen present. The reactor was then cooled to 30° C. and maintained at that temperature in a bath. Stirring was initiated and 0.5 ml. of vinyl pivalate was added to the reactor which was then pressured with ethylene to 100 p.s.i.g., the pressure being maintained during the reaction. Over a period of three hours 45 ml. of 0.06% potassium persulfate was added to the reaction mixture after which time the reaction was stopped by venting off the ethylene. The reaction mixture was filtered to separate the polymeric product which was then dissolved in hot toluene and precipitated by the addition of methanol. The polymeric material was then treated with tetrahydrofuran at room temperature to separate the copolymer from polyethylene. The solvent was then removed leaving a clear flexible rubbery polymer.

Example II

The same procedure set forth in Example I was repeated except that in place of the vinyl pivalate was used a vinyl ester of a mixture of alpha,alpha-dialkyl saturated aliphatic carboxylic acids having 9 carbon atoms prepared by reacting di-isobutylene with water and carbon monoxide in the presence of a strong acid catalyst consisting of $BF_3$ and $H_3PO_4$. The copolymer obtained was similar to the vinyl pivalate-ethylene copolymer of Example I.

Example III

The procedure of Example I was repeated with the substitution for the vinyl pivalate of a vinyl ester of an alpha,alpha-dialkyl saturated aliphatic carboxylic acids having 10 carbon atoms prepared by reacting propylene trimer with carbon monoxide and water in the presence of $BF_3$ and $H_3PO_4$ catalyst. The copolymer obtained was similar to the copolymer of Example I.

Example IV

By way of comparison the process of Example I was repeated with the substitution of vinyl acetate, ethyl acrylate, methyl vinyl ether and vinyl chloride for the vinyl ester of Example I. No copolymers of these monomers and ethylene were obtained.

The copolymers prepared by the process of this invention are rubbery polymers having molecular weights between about 1000 and 100,000 depending on the variable ratios of monomers, catalysts, and reaction conditions used. The special properties of the copolymers obtained according to the invention are associated with the particular structure of the alpha-branched saturated aliphatic monocarboxylic acids used therein. The copolymers have high water and chemical resistance as well as flexibility. Due to these desirable properties, the copolymers may be used in emulsion paints, surface coatings, waxes, alkyl and epoxy resin compositions and in preparing molded articles.

I claim as my invention:

1. A process for preparing a copolymer of an alpha-monoolefin selected from the group consisting of ethylene and propylene and a vinyl ester of an alpha-branched saturated aliphatic monocarboxylic acid which comprises copolymerizing the monomers in a molar ratio of from 4:1 to 1:4 in the presence of an aqueous solution containing from 10 to 60% by weight of a highly dissociated silver salt at a temperature between about 0° and 40° C. and at a pressure of from about 10 to about 1000 p.s.i.g., said silver salt being utilized in an amount from about 10% to 95% by weight based on the total weight of the monomers and the silver salt.

2. A process for preparing a copolymer of ethylene and a vinyl ester of an alpha,alpha-dialkyl saturated aliphatic carboxylic acid of from 4 to 20 carbon atoms which comprises copolymerizing the monomers in a molar ratio of from 4:1 to 1:4 in the presence of an aqueous solution containing from 10% to 60% by weight of silver perchlorate and a free radical initiator selected from the group consisting of an alkyl percarbonate and a persulfate salt at a temperature between about 0° and 40° C. and at a pressure of between about 50 and 500 p.s.i.g., said silver perchlorate being utilized in an amount from about 10% to 95% by weight based on the total weight of the monomers and the silver salt.

3. The process of claim 2 wherein the vinyl ester is vinyl pivalate.

4. The process of claim 2 wherein the acid is the reaction product of di-isobutylene with carbon monoxide and water in the presence of an inorganic acid catalyst.

5. The process of claim 2 wherein the acid is the reaction product of propylene trimer with carbon monoxide and water in the presence of an inorganic acid catalyst.

References Cited
UNITED STATES PATENTS

| | | | |
|---|---|---|---|
| 3,186,974 | 6/1965 | Verberg | 260—85.7 |
| 3,294,727 | 12/1966 | Grommers et al. | 260—29.6 |
| 3,297,670 | 1/1967 | Ehring | 260—88.7 |

JOSEPH L. SCHOFER, *Primary Examiner.*

J. C. HAIGHT, *Assistant Examiner.*